(12) United States Patent
Wojtyczka et al.

(10) Patent No.: US 10,767,690 B2
(45) Date of Patent: Sep. 8, 2020

(54) BEARING HOUSING WITH DAMPING ARRANGEMENT

(71) Applicant: PRATT & WHITNEY CANADA CORP., Longueuil (CA)

(72) Inventors: Czeslaw Wojtyczka, Brampton (CA); Stephen Caulfeild, Rockwood (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/356,367

(22) Filed: Mar. 18, 2019

(65) Prior Publication Data

US 2020/0096041 A1 Mar. 26, 2020

Related U.S. Application Data (60) Provisional application No. 62/734,606, filed on Sep. 21, 2018.

(51) Int. Cl.
  *F16C 27/02* (2006.01)
  *F01D 25/16* (2006.01)
  *F01D 25/04* (2006.01)

(52) U.S. Cl.
  CPC .............. *F16C 27/02* (2013.01); *F01D 25/04* (2013.01); *F01D 25/162* (2013.01); *F01D 25/164* (2013.01); *F05D 2220/32* (2013.01); *F05D 2240/54* (2013.01); *F05D 2260/96* (2013.01); *F16C 2360/23* (2013.01)

(58) Field of Classification Search
  CPC ...... F16C 27/02; F16C 27/06; F16C 2360/24; F01D 25/04; F01D 25/162; F01D 25/164; F05D 2220/32; F05D 2240/54; F05D 2260/96

USPC ......... 384/99, 103, 215, 527, 535–536, 582; 417/174.3; 267/140.4, 141; 180/381–382
See application file for complete search history.

(56) References Cited

U.S. PATENT DOCUMENTS 2,244,197 A * 6/1941 Hessler ................. F16C 27/066
  384/569
2,650,866 A * 9/1953 Knudson ............... F16C 27/066
  384/537

(Continued)

FOREIGN PATENT DOCUMENTS

DE  102007060968 A1 * 7/2008 ............. B65G 39/06
JP  2011033064 A * 2/2011 ............. F16C 33/60

*Primary Examiner* — Marcus Charles
(74) *Attorney, Agent, or Firm* — Norton Rose Fulbright Canada LLP (57) ABSTRACT

A bearing housing for connecting a bearing to a supporting structure of a gas turbine engine is discussed. The bearing housing has an inner wall and an outer wall radially spaced apart from the inner wall between which an annular space is defined. A device extends from the inner wall toward the outer wall and includes at least a first and a second member in series between the inner and outer walls, the second member having a radial stiffness greater than a radial stiffness of the first member. The device may operate in multiple operating stages, where in a first stage the first member of the device deforms to absorb at least partially a vibration load over a given range of vibration amplitude when the bearing housing deflects, and where in a subsequent second stage the second member of the device increases a total radial stiffness of the assembly of the bearing housing and device over the bearing housing alone.

18 Claims, 8 Drawing Sheets

(56) References Cited

U.S. PATENT DOCUMENTS

| | | | |
|---|---|---|---|
| 2,733,108 A * | 1/1956 | Cowles | B64C 9/02 384/582 |
| 3,093,427 A * | 6/1963 | Vasta | F16C 19/10 384/536 |
| 3,473,853 A * | 10/1969 | Bill | F16C 27/045 384/535 |
| 3,554,619 A * | 1/1971 | Irwin | F16C 27/04 384/536 |
| 3,672,734 A * | 6/1972 | Bando | F16C 27/066 384/536 |
| 3,890,854 A * | 6/1975 | Pitner | F16C 27/066 74/492 |
| 3,901,557 A | 8/1975 | Daniels | |
| 4,336,968 A * | 6/1982 | Hibner | F01D 21/045 384/99 |
| 4,337,982 A | 7/1982 | Moringiello | |
| 4,496,252 A * | 1/1985 | Horler | C23C 16/45504 384/215 |
| 6,007,252 A * | 12/1999 | Thelen | F16C 19/54 384/535 |
| 6,030,128 A * | 2/2000 | Pontzer | F16C 35/00 384/476 |
| 6,480,363 B1 * | 11/2002 | Prater | F16C 27/04 360/265.7 |
| 6,817,771 B2 * | 11/2004 | Campbell | F16F 7/104 384/535 |
| 6,863,443 B2 * | 3/2005 | Mahling | F16C 27/066 384/536 |
| 6,869,226 B2 * | 3/2005 | Henkel | B60K 17/22 180/381 |
| 7,517,155 B2 * | 4/2009 | Stout | F16C 23/04 384/535 |
| 8,113,772 B2 * | 2/2012 | Baumhauer | F01D 5/10 415/174.3 |
| 8,272,786 B2 * | 9/2012 | Cottrell | B64D 27/26 188/298 |
| 8,647,049 B2 | 2/2014 | Evans | |
| 8,746,981 B2 * | 6/2014 | Hartmann | F16C 27/063 384/215 |
| 9,016,952 B2 | 4/2015 | Bedenk | |
| 9,500,100 B2 | 11/2016 | Carter | |

\* cited by examiner

FIG. 3

FIG_3A

FIG_3B

BEARING HOUSING WITH DAMPING ARRANGEMENT

TECHNICAL FIELD

The application relates generally to bearing assemblies in a gas turbine engine and, more particularly, to bearing housings for bearings in a gas turbine engine.

BACKGROUND OF THE ART

Gas turbine engines typically include bearings to support one or more rotating shaft(s) (e.g. low-pressure compressor rotor, high-pressure compressor rotor, fan rotor) or one or more section(s) of one or more rotating shaft(s). However, known bearing assemblies, including bearing housings, may typically have limited capacity of reducing vibration transmission, for instance vibrations imparted by the rotating shaft(s) to the supporting structures of gas turbine engines via the bearing(s), such that this may limit performances of gas turbine engines.

SUMMARY

In one aspect, there is provided a bearing housing for a bearing in a gas turbine engine, the bearing housing comprising: an inner wall configured to support the bearing, and an outer wall radially spaced from the inner wall, an annular space being defined between the inner and outer walls; and a device extending from the inner wall toward the outer wall, the device including at least a first and a second member in series between the inner and outer walls, the second member having a radial stiffness greater than a radial stiffness of the first member.

In another aspect, there is provided a bearing housing for a bearing in a gas turbine engine, the bearing housing comprising: an inner shell configured to support the bearing; an outer shell disposed radially outwardly from and connected to the inner shell, the inner shell and the outer shell defining an annular space therebetween, the annular space having a radial dimension; and a snubber and a damper disposed in the annular space, the snubber having a stiffness greater than a stiffness of the damper, the damper configured to deform in use when the inner and outer shells move radially toward one another.

In a further aspect, there is provided a method for absorbing radial vibrations transmitted by a bearing to a bearing housing having inner and outer cylindrical walls defining between them an annular space, the method comprising: deforming a damper in the annular space and receiving at the damper a radial vibration load from the bearing; and then loading a snubber in the annular space having a stiffness greater than the damper to increase a radial stiffness of the bearing housing.

DESCRIPTION OF THE DRAWINGS

Reference is now made to the accompanying figures in which.

DETAILED DESCRIPTION

Figure 1:
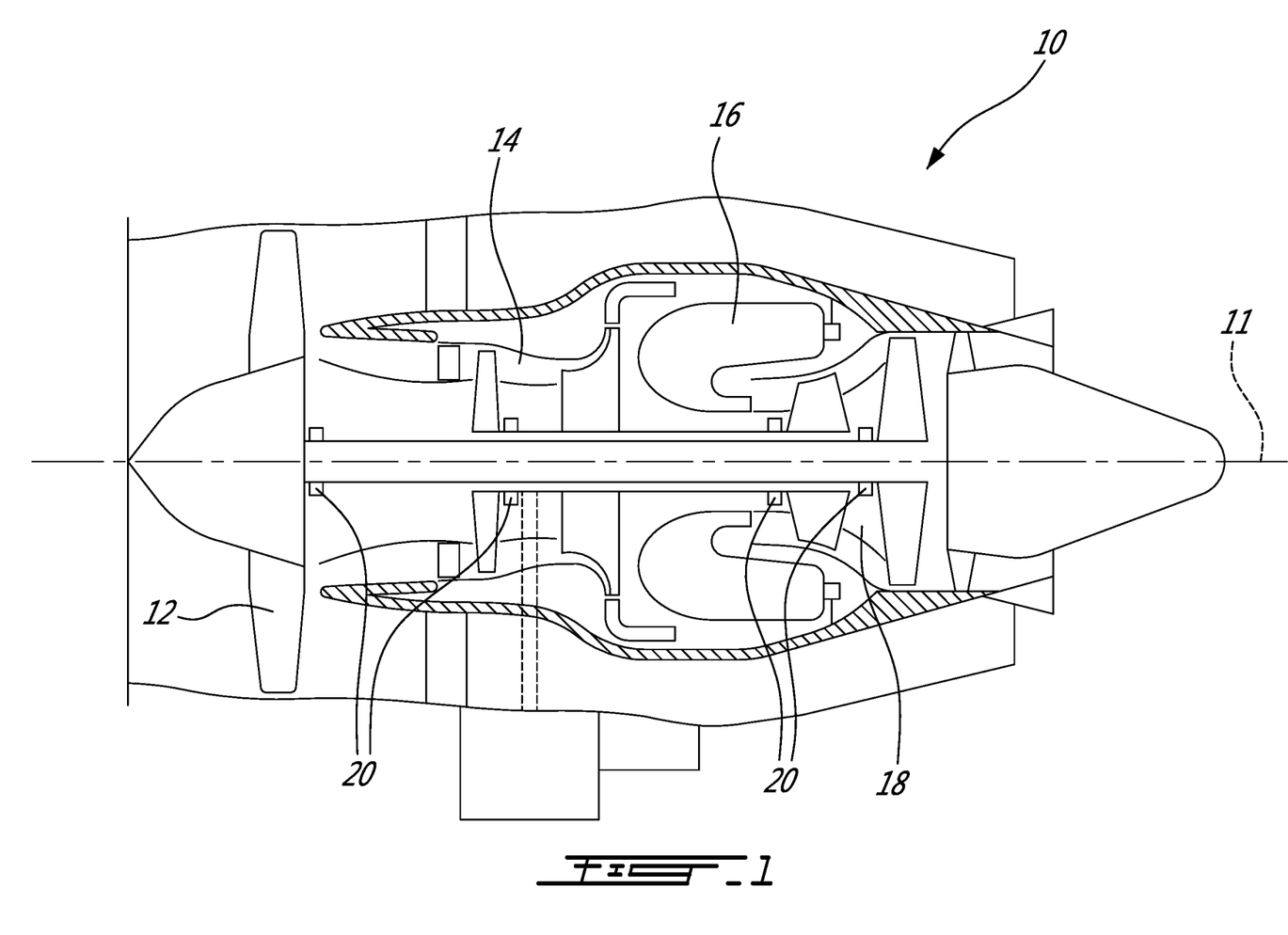
FIG. 1 is a schematic cross-sectional view of a gas turbine engine, according to a particular embodiment.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The gas turbine engine 10 also includes one or more rotating shaft(s) mounted thereto using mounting devices allowing rotational and/or axial movement, with two distinct shafts shown in FIG. 1. For instance, the compressor section 14 and the turbine section 18 may each have a single shaft or multiple independent shafts in parallel or in series, rotating dependently or independently, depending on the types of turbine engine, and mounted to the gas turbine engine 10 in many suitable ways.

Referring to FIG. 1, the mounting devices for mounting rotating shafts in the gas turbine engine 10 may be bearings 20, such as ball bearings, roller bearings, thrust bearings, or any other suitable types of bearings. Also, there may have a combination of different types of bearings 20 inside the gas turbine engine 10.

A bearing 20 in the gas turbine engine 10 is supported by a bearing housing 30 configured to receive the bearing 20. An attenuation of vibration loads imparted by the rotating shafts or some components mounted thereon like the fan 12 (e.g. vibrations generated by the airflow inside or outside the engine) and transmitted via the bearing 20 to other components of the gas turbine engine 10 may be desirable. In the present case, the bearing housing 30 is configured to reduce (e.g. limit) vibration loads transmitted via the bearing 20 to other components of the gas turbine engine 10. The bearing housing 30 includes a device 40 for absorbing at least partially vibration loads transmitted via the bearing 20 and for increasing a radial stiffness of the assembly of the bearing housing 30 and device 40 over the bearing housing 30 alone. Such device 40 may be used in combination or without the typical oil bearing damper (sometimes referred to as oil film damper) between the inner wall 31 and the outer race of the bearing 20. Such oil film damper (not shown) is typically used to absorb vibration energies (e.g. caused by small rotor imbalances) and smaller vibration amplitudes.

Figure 2:
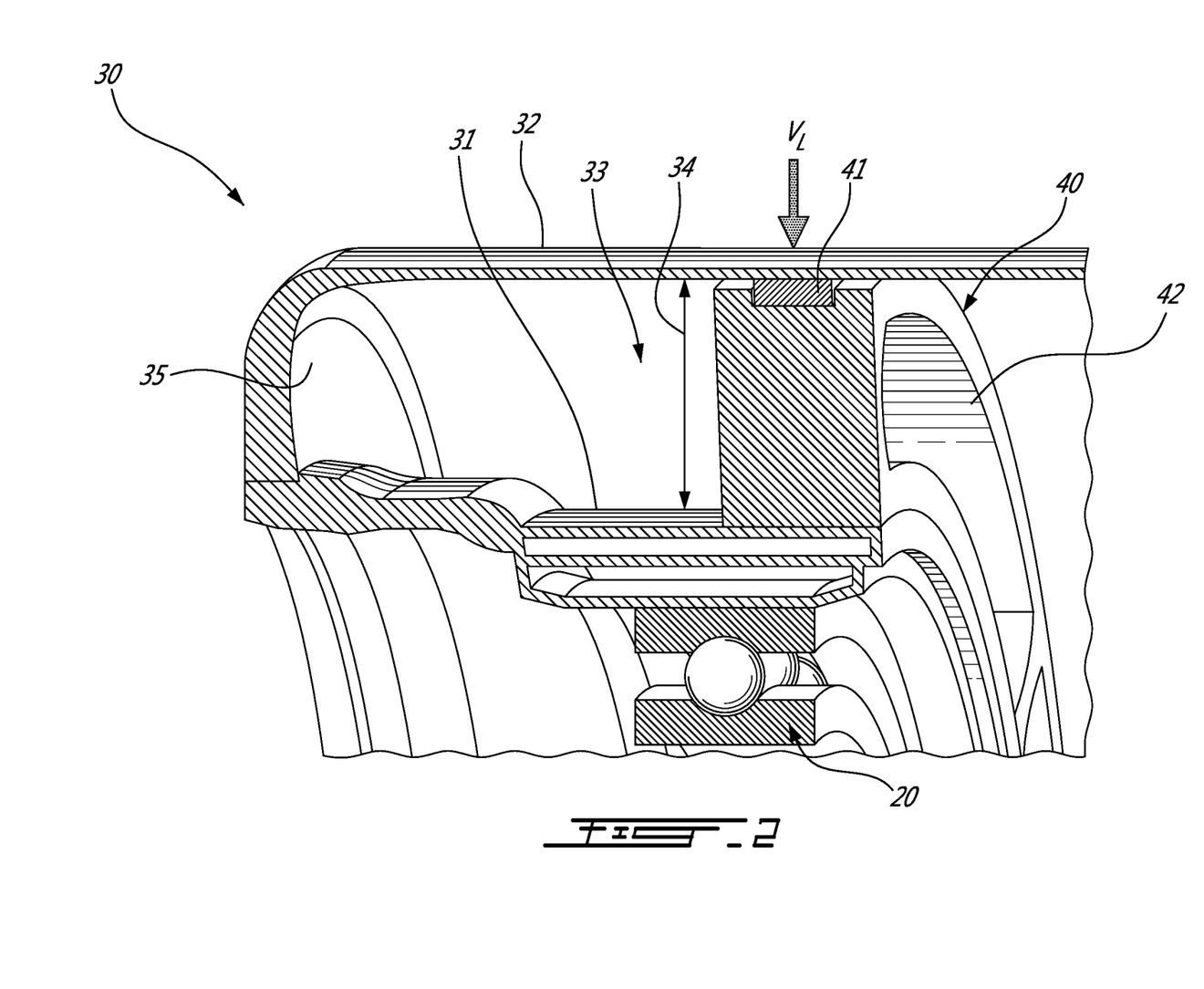
FIG. 2 is a cross-sectional fragmentary view of a bearing housing which can be used in a gas turbine engine such as illustrated in FIG. 1, according to a particular embodiment.
Figure 3:
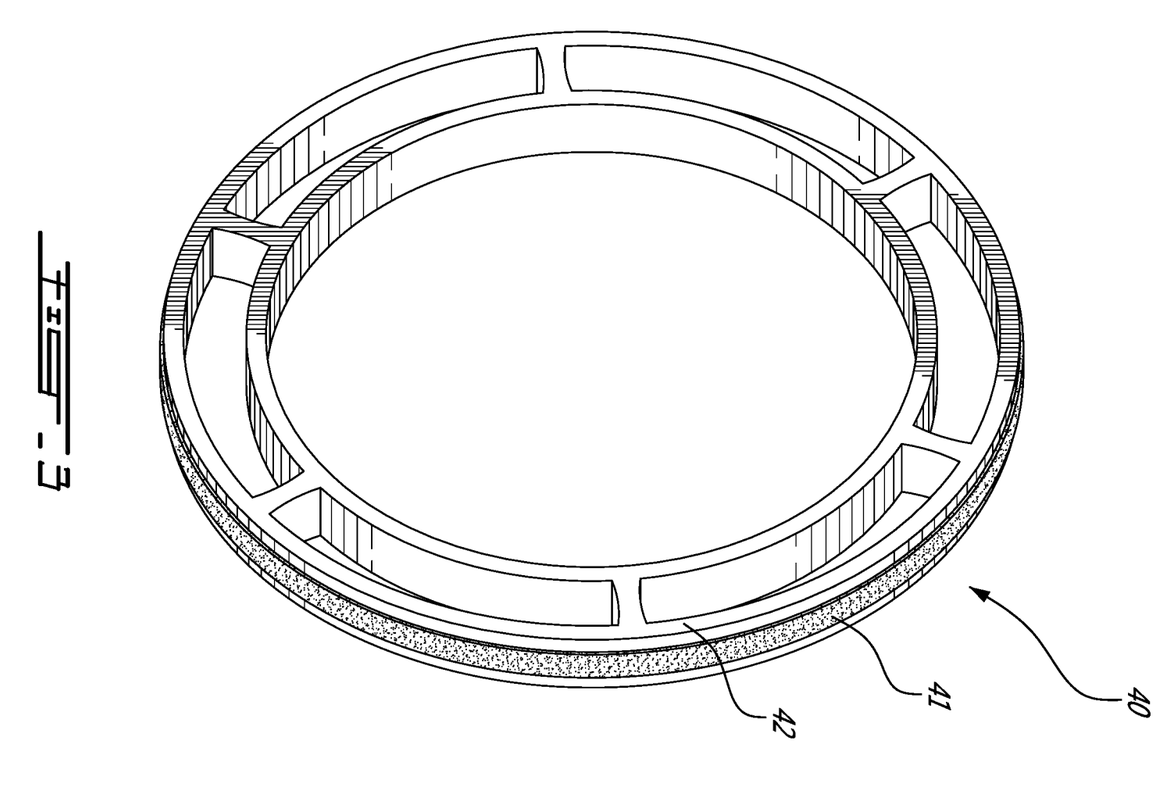
FIG. 3 is a perspective view of a damping device of the bearing housing shown in FIG. 2, according to a particular embodiment.
Figure 4:
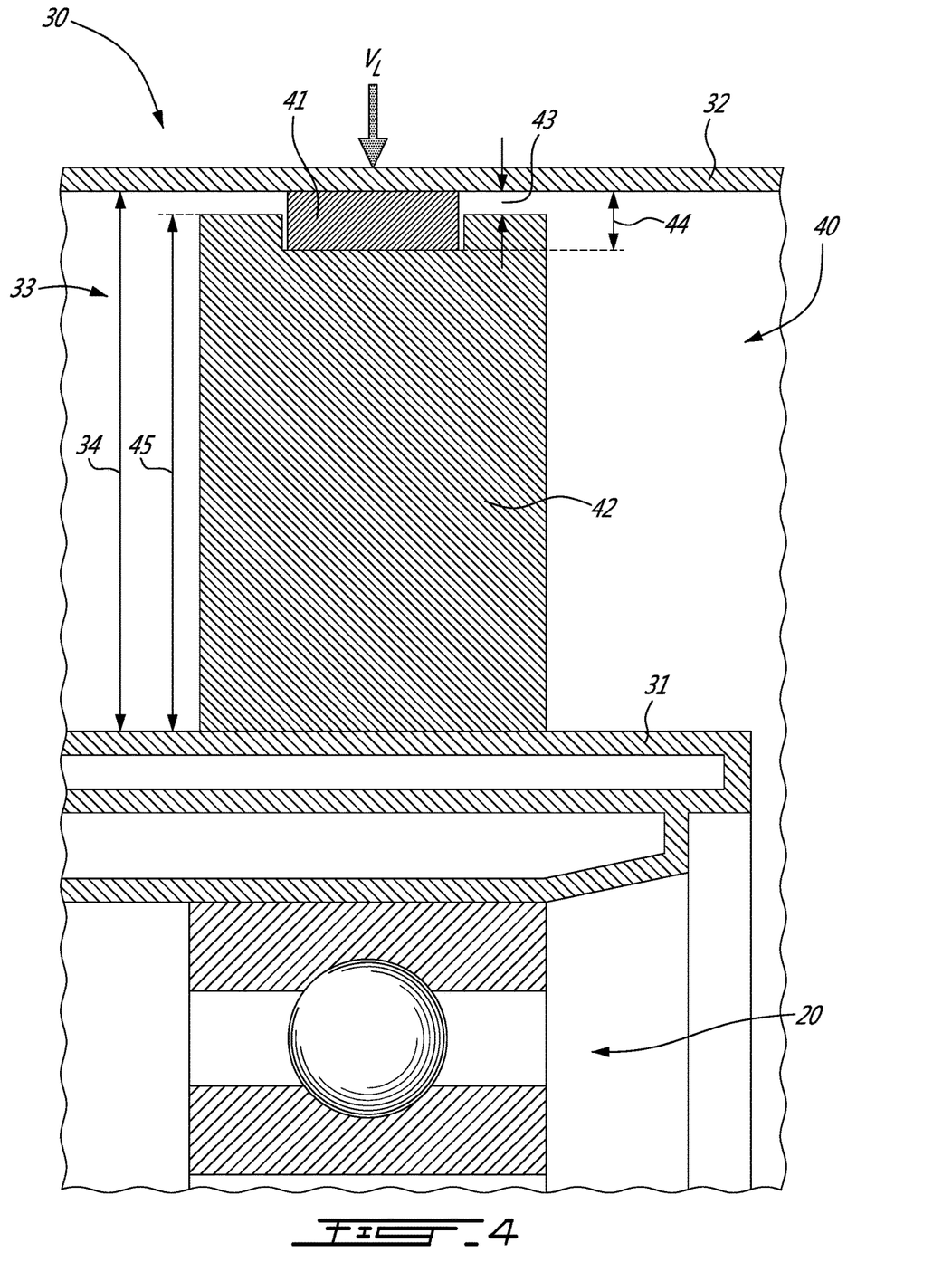
FIG. 4 is a schematic cross-sectional view of the device of FIG. 3 inside the bearing housing of FIG. 2, shown in an operating stage, according to a particular embodiment.
Figure 5:
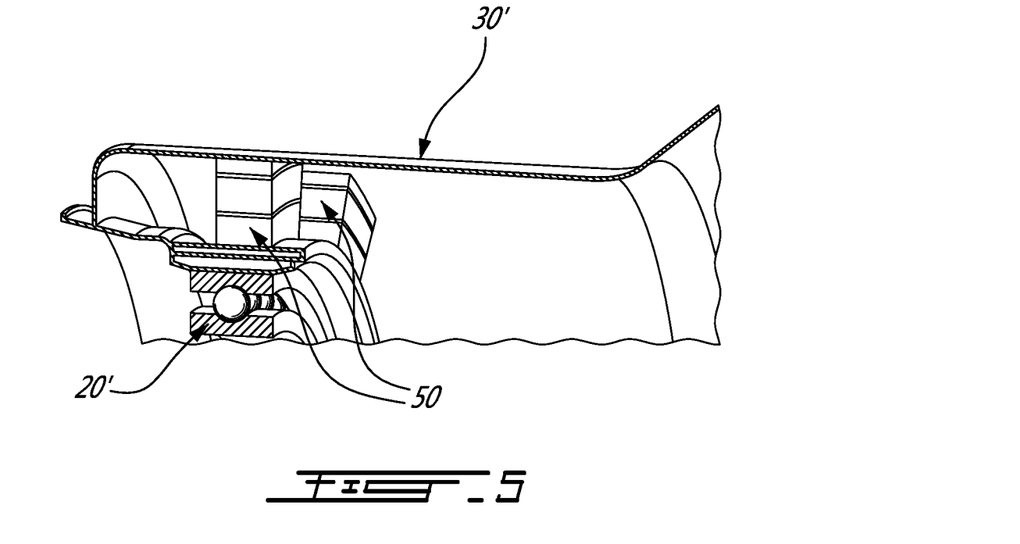
FIG. 5 is a perspective cross-sectional fragmentary view of a bearing housing inside an example of a gas turbine engine as illustrated in FIG. 1, with a damping device, according to another particular embodiment.
Figure 6:
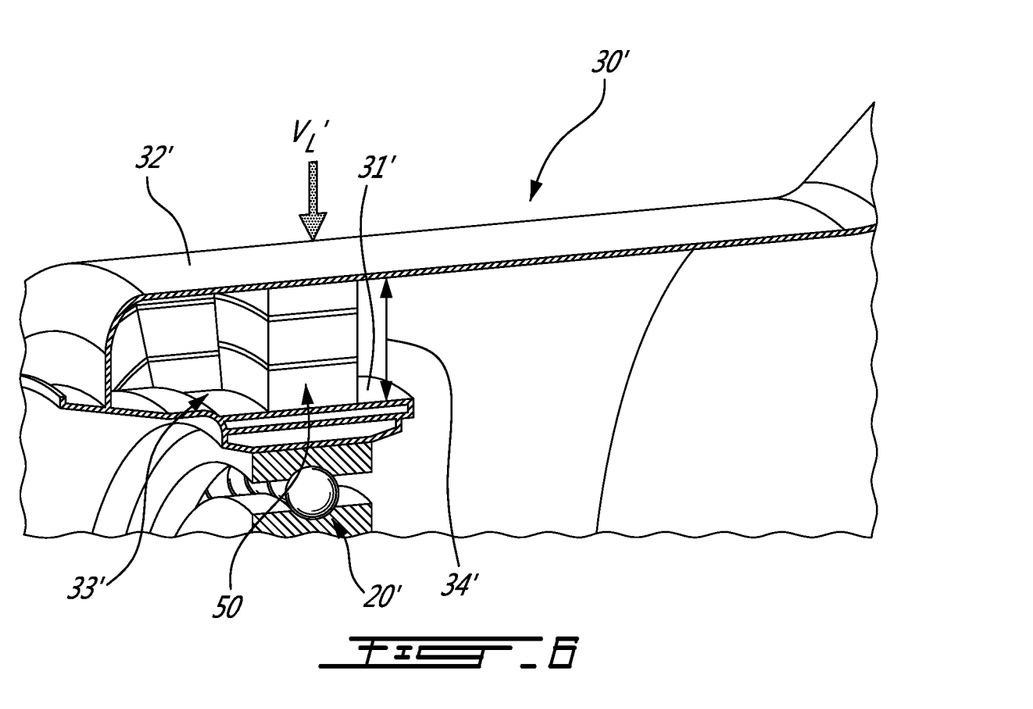
FIG. 6 is another perspective cross-sectional fragmentary view of the bearing housing shown in FIG. 5, with the damping device, according to such particular embodiment.
Figure 7:
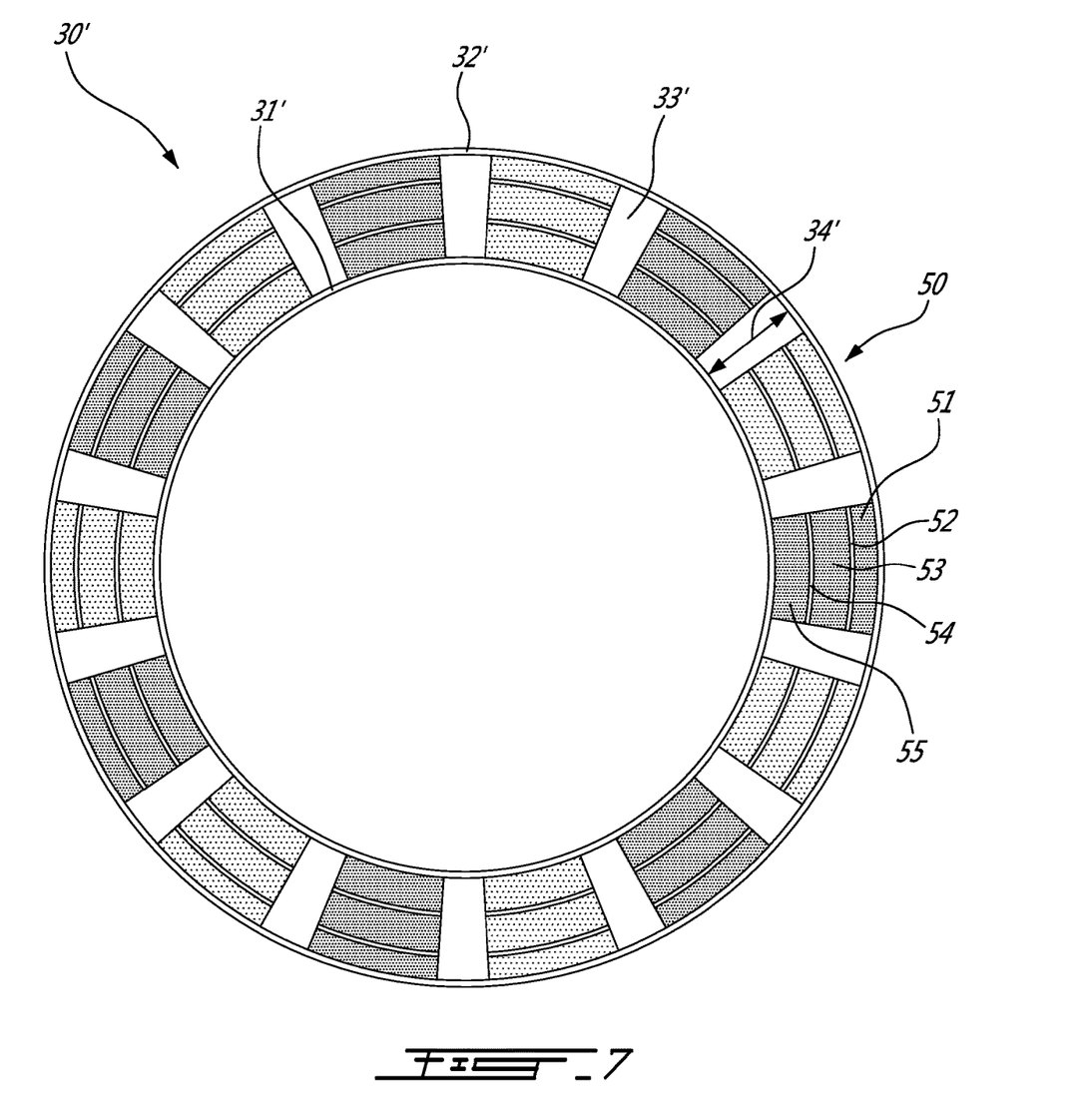
FIG. 7 is a cross-sectional axial view of the bearing housing shown in FIGS. 5-6.

FIGS. 2 to 4 shows a particular embodiment of the bearing housing 30 comprising such device 40. The bearing housing 30 includes an inner wall 31 configured to support a bearing 20 and an opposite outer wall 32 radially offset relative to the inner wall 31. In an embodiment, the inner wall 31 may be defined as an inner shell and the outer wall 32 may be defined as an outer shell. An annular space 33 is defined between the inner wall 31 and the outer wall 32. With additional reference to FIGS. 2 to 4, the annular space 33 has a radial dimension 34. As it will be discussed later, the radial dimension 34 of the annular space 33 may vary upon radially loading the bearing housing 30. In this particular embodiment, the inner wall 31 has an inner cylindrical surface for seating the bearing 20 and an outer cylindrical surface on which the device 40 may rest. A typical oil bearing damper (oil film damper) may be disposed between the inner wall 31 and the outer race of the bearing 20. In an embodiment, the typical oil bearing damper may be disposed radially in line with the device 40, although other arrangements are contemplated as well, such as with an offset. The outer wall 32 has an inner cylindrical surface configured to contact the device 40. The inner wall 31 and the outer wall 32 may be implemented differently in other embodiments.

In some cases, such as in the embodiment of FIG. 2, the inner wall 31 and the outer wall 32 are connected to one another via a wall 35, in this case a hairpin-shaped wall. Such bearing housing configuration may be referred to as having a hairpin arrangement, with the name derived from the hairpin-like shape of the cross-section of the sequence of the structure 32, the wall 35 and the inner wall 31. The bearing housing 30 may have a different shape (e.g. no hairpin arrangement) in other particular embodiments. For instance, the wall 35 may be a straight wall instead of being a hairpin-shaped wall. Alternately, the inner wall 31 and the outer wall 32 may be interconnected to one another only by the device 40 connected to each one of the inner wall 31 and the outer wall 32, without the wall 35.

An allowable range of radial movement of the bearing 20 relative to other components of the gas turbine engine 10 may be desirable. To this end, in some cases, the inner wall 31 is connected to the outer wall 32 in cantilever fashion with one end of the inner wall 31 being free, such that the inner wall 31 in cantilever may vibrate relative to the outer wall 32. In a particular case, the wall 35 connecting the inner wall 31 and the outer wall 32 may elastically deflect (radial deflection) to allow such vibrating movement between the inner wall 31 and the outer wall 32. As such, the radial dimension 34 of the annular space 33 may vary, which permits an allowable range of radial movement of the bearing 20 relative to the outer wall 32. The bearing housing 30 (with or without the device 40) has a total radial stiffness Sh (i.e. radial stiffness of the bearing housing 30 as a whole) that allows it to radially elastically deform upon loading the bearing housing 30 with a radial load, in this case a radial vibration load VL.

The device 40 may absorb at least partially the radial vibration load VL transmitted via the bearing 20 and may vary the total radial stiffness Sh of the bearing housing 30. In an embodiment, the device 40 is disposed in the annular space 33 of the bearing housing 30 and extends from the inner wall 31 toward the outer wall 32. In an embodiment, the device 40 may extend from the inner wall and come in contact with the outer wall 32 upon the bearing 20 exceeding the allowable range of radial movement. However, the device 40 may contact the outer wall 32 permanently when installed in the bearing housing 30 (i.e. even with no vibration loads). The device 40 includes at least a first member 41 and a second member 42. Referring to FIG. 4, the first member 41 and the second member 42 are disposed on one another (i.e. the first member 41 and the second member 42 are in series) between the inner wall 31 and the outer wall 32. The first and second members 41, 42 may be directly disposed on one another or may have another member in between them. The first and second members 41, 42 may also be connected together in many suitable ways, including by bonding, molding, and overmolding. The first and second members 41, 42 may also be mechanically interlocked (i.e. they may be shaped such that they may mechanically interlock to one another).

In an embodiment, the second member 42 is disposed directly over the outer cylindrical surface of the inner wall 31 such that the second member 42 directly contacts the inner wall 31. The second member 42 may be bonded to the inner wall 31 using an adhesive, mounted on the inner wall 31 in a tight fit (i.e. tight fit or press fit) fashion, welded to it, etc. In other embodiments, the relative position of the members may be different. For instance, the first and second members 41, 42 may be disposed inversely, such that the second member 42 may be disposed along the inner cylindrical surface of the outer wall 32 and the first member 41 may be disposed radially inwardly therefrom.

Figure 3A:
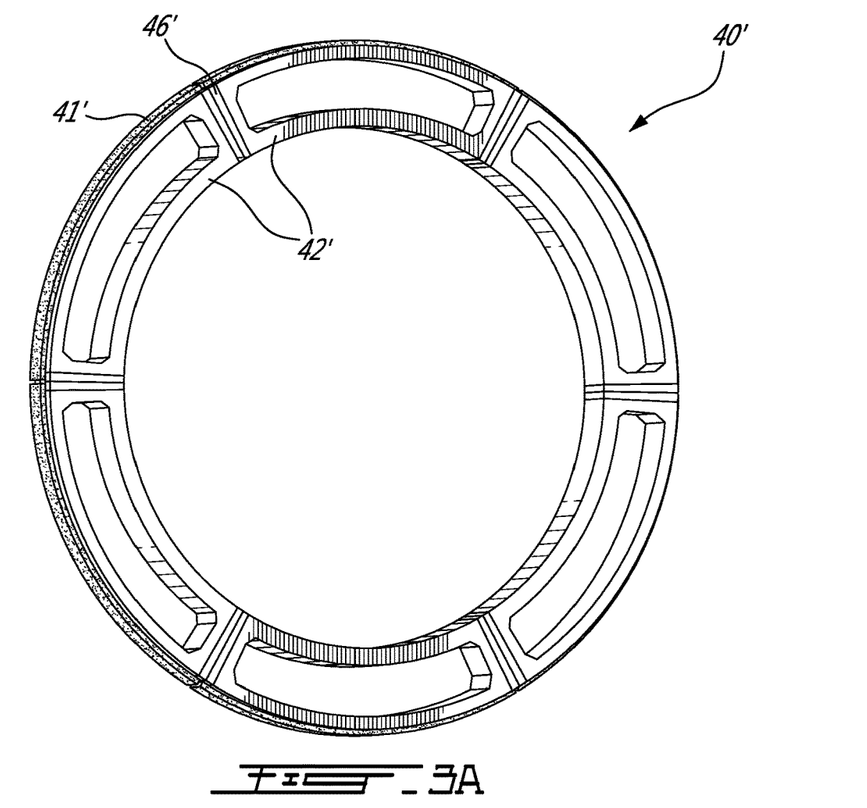
FIGS. 3A and 3B show respectively a perspective view and a fragmentary view of a variant of the damping device shown in FIG. 3.
Figure 3B:
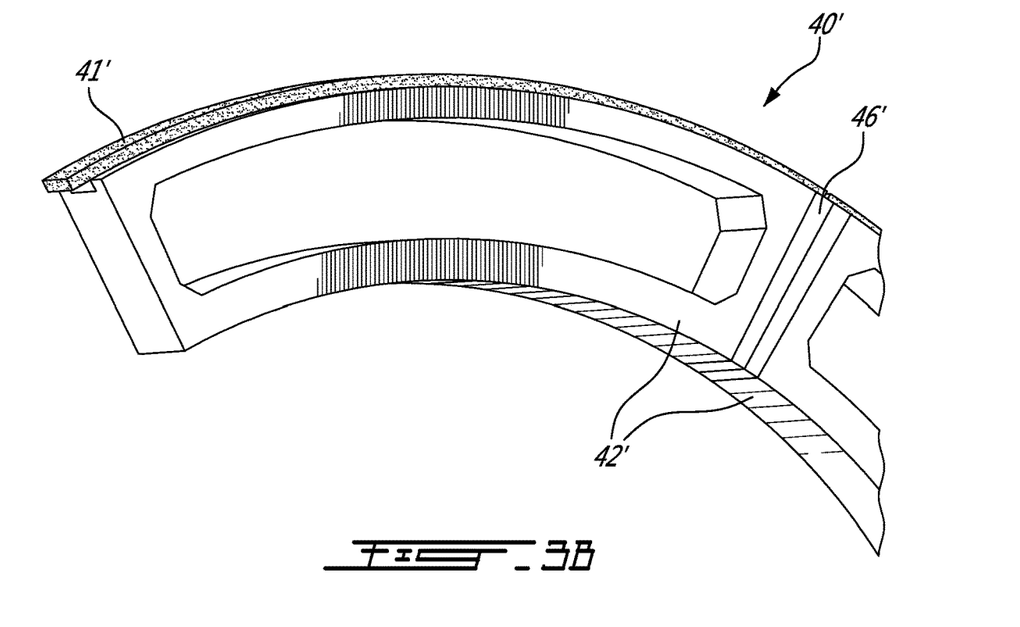

The first and second members 41, 42 may have many suitable shapes. For instance, in an embodiment, the first member 41, sometimes referred to as a damper or spring-damper, is annular (e.g. a ring shape) and extends circumferentially along the second member 42, inside the annular space 33. In an embodiment, the second member 42, sometimes referred to as a snubber, has a continuous annular shape and extends circumferentially along the inner wall 31 of the bearing housing 30 inside the annular space 33. As shown in FIG. 3, in this particular embodiment, the second member 42 may have an hollowed-out body with a plurality of radially elongated members (e.g. spokes). This may reduce the weight of the second member 42 and in turn of the device 40 as a whole. At its periphery, the second member 42 may have a peripheral recess in the form of an annular channel in which the first member 41 may be received at least partially, though this is only an option as the second member 42 may have no such annular channel. As such, when received in the annular channel, a portion of the first member 41 may extend radially in parallel to the second member 42 between the inner and outer walls 31, 32. As observed from FIG. 4, the side walls of the annular channel may define abutments that limit transversal expansion of the first member 41 when deforming as a result of a compressive load VL in the radial direction. A radial gap 43 may be defined between the second member 42 and one of the inner and outer walls 31, 32, where the radial gap 43 in FIG. 4 is shown radially between said side walls and the outer wall 32. In other embodiments, the first and second members 41, 42 may be shaped differently. For instance, the first member 41 may not have a ring shape. The first member 41 may be discontinuous (e.g. segmented in a plurality of distinct pieces disposed on the second member 42). Also, in other embodiments, the second member 42 may not have a continuous annular shape and/or may not have a hollowed-out body. For instance, in some cases, the second member 42 may be discontinuous (e.g. segmented in a plurality of pieces disposed peripherally along the inner wall 31). This is visible in the example shown in FIGS. 3A and 3B. As shown, the segments of the second member 42' may be connected to adjacent ones of the segments by interfaces 46'. More specifically, in the example shown, the interfaces 46' takes the form of one or more layer of polymeric material adhered to (or otherwise connected to) adjacent segments in between them. In this configuration, since the polymeric material may elastically deform due to its inherent viscoelastic characteristics (e.g. compressed), they may allow small tangential motions between the segments of the second member 42'. This may further provide damping of vibrations by the damping device 40'. Other types of interfaces 46' may allow such circumferential motions between the segments of the second member 42' in other variants, such as coils springs. In this example, the first member 41' is segmented in a plurality of distinct pieces and disposed on the segments of the second member 42'. Each segments of the first member 41' may be disposed on a respective one of the segments of the second member 42', such as shown, although this may not be the case in other variants. For instance, segments of the first member 41' may extend over two or more adjacent ones of the segments of the second member 42', in some cases. Also, in some cases, the second member (42, 42') may have a solid-body shape (i.e. not hollowed-out).

In this particular embodiment, the second member 42 is radially thicker than the first member 41. That is, a radial dimension 44 of the first member 41 is smaller than a radial dimension 45 of the second member 42 in a radial direction. This may be different in other embodiments.

The second member 42 may be stiffer (e.g. slightly or substantially stiffer) than the first member 41. That is, the second member 42 may be harder to compress or stretch than the first member 41. In this particular embodiment, the first member 41 has a stiffness S1 and the second member has a stiffness S2. The stiffness S2 is substantially greater than the stiffness S1. In some embodiments, the stiffness S1, S2 of the first and second members 41, 42 may be measured as a compressive strength, a tensile strength, or a modulus of elasticity (e.g. Young's modulus). In other embodiments, the first member 41 may be stiffer than the second member 42.

The first member 41 and the second member 42 may be made of any suitable material. For instance, in some cases, the first member 41 is made at least in part of a viscoelastically deformable material. More particularly, in some cases, the first member 41 is made at least in part of an elastomeric material (e.g. rubber). In some cases, the first member 41 is made of a lattice structure, such as a metal foam. Other materials with viscoelastic properties may be used. Viscoelastic materials may absorb energy/loads when deformed (i.e. they may damp/dissipate energy/load). The first member 41 may be selected to deform elastically over a distance, which corresponds to the radial gap 43 in FIG. 4, when exposed to a compressive force. As for the second member 42, in some cases, it may be made at least in part of a rigid material (i.e. not a viscoelastic material), such as a metal alloy, a titanium alloy, an aluminium alloy, or a composite material such as a fiber-reinforced material. Rigid materials may contribute to increasing the overall stiffness of the device 40 and in turn the total radial stiffness Sh of the bearing housing 30, as discussed later. Other suitable materials may be used.

A deformation of the device 40 may occur when the radial dimension 34 of the annular space 33 varies. In some cases, where the device 40 does not contact the outer wall 32 permanently when installed in the bearing housing 30, as discussed above, such deformation only occurs once the device 40 contacts the outer wall 32. As such, an initial slight radial movement of the bearing 20 may occur (e.g. because of the compression of the oil film damper, if present) without starting to deform the device 40. As discussed above, the radial dimension 34 of the annular space 33 may vary upon radially loading the bearing housing 30. As the radial dimension 34 of the annular space 33 is being reduced, the device 40 is squeezed (i.e. compressed) between the inner wall 31 and the outer wall 32. In this particular embodiment, since the stiffness S2 of the second member 42 is substantially greater than the stiffness S1 of the first member 41, the first member 41 may deform to absorb at least partially the radial vibration load VL, while the second member 42 remains non-deformed (i.e. at least substantially non-deformed). Stated differently, the radial dimension 45 of the second member 42 remains substantially invariable while the first member 41 is being deformed and the device 40 compressed between the inner wall 31 and the outer wall 32. Stated differently, a differential between the radial dimension 45 of the second member 42 and the radial dimension 34 of the annular space 33 varies (i.e. reduces) and the radial dimension 45 of the second member 42 remains substantially constant while the first member 41 is being deformed.

The device 40 may operate in multiple operating stages (e.g. serial operating stages). For instance, in this particular embodiment, a first operating stage corresponds to a variation of the radial dimension 44 of the first member 41 over a variation of the radial dimension 34 of the annular space 33 upon radially loading the bearing housing 30. In the first operating stage, a ratio of the variation of the radial dimension 44 of the first member 41 over the variation of the radial dimension 34 of the annular space 33 is at least 0.95. Stated differently, in the first operating stage, at least 95% of the decrease of the radial dimension 34 results from the deformation of the first member 41, and consequently by a decrease in radial dimension 44. In the first operating stage, the gap 43, which corresponds in this case to a differential between the radial dimension 45 of the second member 42 and the radial dimension 34 of the annular space 33, decreases until it is fully suppressed. Thus, in this particular embodiment, in the first operating stage, the radial dimension 34 of the annular space 33 reduces while the first member 41 deforms to absorb at least partially the radial vibration load VL transmitted to the bearing housing 30 via the bearing 20 until the gap 43 is fully suppressed (i.e. the differential between the radial dimension 45 of the second member 42 and the radial dimension 34 of the annular space 33 stops varying). Alternatively, the gap 43, again corresponding to a differential between the radial dimension 45 of the second member 42 and the radial dimension 34 of the annular space 33, decreases until the first member 41 resists to further deformation. These scenarios may occur in cases of more substantial rotor imbalance that could not be fully compensated by an oil film damper. For example, more substantial rotor imbalances may be caused by foreign objects ingested in the engine (e.g. small birds, hail, icing condition, etc.). When these scenarios occur, the device 40 transitions to a second operating stage.

As discussed above, the device 40, as part of the bearing housing 30, is configured to increase the total radial stiffness Sh of the bearing housing 30, in contrast to a bearing housing without a device 40. To this end, in an embodiment, in the second operating stage, the second member 42 is configured to increase the total radial stiffness Sh of the bearing housing 30 after the gap 43 is fully suppressed or when the combination of the compressed first member 41 and the second member 42 oppose a resistance preventing further substantial deformation, whereby the gap 43 no longer decreases. The gap 43 may be selected to permit the allowable range of radial movement of the bearing 20. Consequently, in this embodiment, as long as the gap 43 is present, the bearing may move radially relative to the outer wall 32, and in contrast, when the gap 43 is fully suppressed, the second member 42 bridges the inner wall 31 and the outer wall 32, whereby the device 40 prevents any further radial movement of the bearing 20 exceeding the allowable range of radial movement of the bearing 20. In an embodiment, when the gap 43 is fully suppressed, the first member 41 fully recedes in the peripheral recess defined in the second member 42, and thus the second member 42 contacts both the inner wall 31 and the outer wall 32. The second member 42 thus implements a rigidifying member (e.g. internal rib) interconnecting the inner wall 31 and the outer wall 32 of the bearing housing 30, thereby radially rigidifying the bearing housing 30. As understood from above, the rigidifying member may be embodied by the compressed first member 41 and the second member 42.

FIGS. 5 to 8 show another particular embodiment of the bearing housing 30 and the device for absorbing at least partially vibration loads transmitted via the bearing 20 and for varying a total radial stiffness of the bearing housing 30. With reference to this particular embodiment, there is provided a bearing housing 30' that comprises an inner wall 31' configured to connect to a bearing 20' and an outer wall 32' disposed radially outwardly from and connected to the inner wall 31'. An annular space 33' is defined between the inner wall 31' and the outer wall 32'. The annular space 33' has a radial dimension 34' and the bearing housing 30' has a total radial stiffness Sh'. Similarly to an embodiment discussed above, the inner wall 31' and the outer wall 32' are configured to allow a relative radial movement therebetween. As such, the radial dimension 34' of the annular space 33' may vary upon radially loading the bearing housing 30, which permits an allowable range of radial movement of the bearing 20' relative to the outer wall 32'.

In this particular embodiment, a device 50 is part of the bearing housing 30' and disposed in the annular space 33' and is configured to absorb at least partially a radial vibration load VL' and to increase the total radial stiffness Sh' of the bearing housing 30'.

The device 50 includes one or more bodies spaced apart and disposed circumferentially between the inner wall 31' and the outer wall 32' of the bearing housing 30'. In this particular embodiment, each one of the plurality of bodies includes a plurality of members disposed on one another, for instance in the form of layers or as layered over one another (i.e. layers in series).

One or more of the members of the plurality of members may be configured to absorb at least partially the radial vibration load VL' and/or configured to contribute to increasing the total radial stiffness Sh' of the bearing housing 30', as discussed below.

Figure 8:
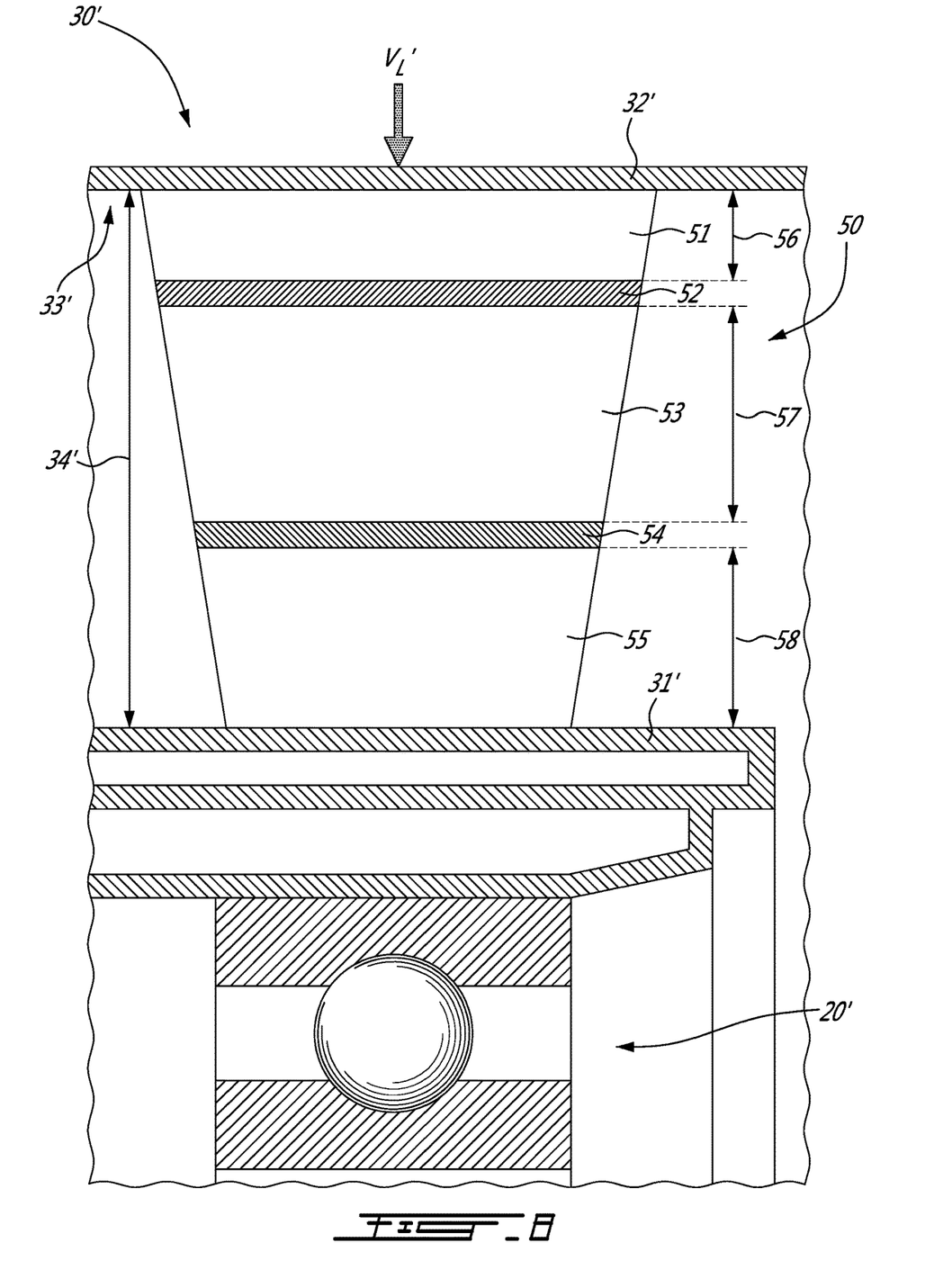
FIG. 8 is a schematic cross-sectional view of the device of FIG. 5 inside the bearing housing, shown in an operating stage, according to particular embodiment.

More particularly, in an embodiment, at least one of the bodies of the device 50 includes a first member 51, a second member 52, a third member 53, a fourth member 54 and a fifth member 55 disposed in series on one another. There may be as little as two members in an embodiment corresponding to the embodiment illustrated in FIG. 4 described above, but also more than the five members as illustrated in FIG. 8. These members 51, 52, 53, 54, 55 may be connected to one another in any suitable ways, including adhesively bonding, comolding, high-frequency molding, mechanical interlocking, etc. One or more of the members 51, 52, 53, 54, 55 may be made at least in part of a viscoelastically deformable material (e.g. an elastomeric material, such as rubber, or a lattice structure, such as a metal foam). One or more of the members 51, 52, 53, 54, 55 may additionally or alternately be made at least in part of a rigid material, such as a metal alloy, a titanium alloy, an aluminium alloy, a composite material such as a fiber-reinforced material, or other relatively rigid material. The bodies of the device 50 resulting from stacking these members 51, 52, 53, 54, 55 may each absorb partially the radial vibration load VL' and/or contribute to increasing the total radial stiffness Sh' of the bearing housing 30' as they become part of the bearing housing 30'.

In an embodiment, the first, third and fifth members 51, 53, 55 are each made at least in part of an elastomeric material and are spaced apart from one another by the second and fourth members 52, 54, which are each made at least in part of a rigid material in the form of a layer. Having layers of rigid material interleaved between members of elastomeric materials (or lattice structure, such as metal foam) may allow the different viscoelastically deformable members 51, 53, 55 to better be secured to one another, and/or contribute to the structural integrity of the device 50 while it deforms during operation (e.g. the rigid layers may limit transversal deformation of the viscoelastic members implementing each one of the bodies when compressed, as the rigid layers may not stretch or not otherwise deform substantially when the bodies are compressed). Also, having rigid members such as the second and fourth members 52, 54 may contribute to rigidifying the device 50 and in turn increasing the total radial stiffness Sh' of the bearing housing 30'.

Each one of the members 51, 52, 53, 54, 55 may or may not have different dimensions (e.g. radial dimension, transversal dimension, etc.), and/or a different stiffness. As such, the members 51, 52, 53, 54, 55 may react differently when subjected to the radial vibration load VL' transmitted from the bearing housing 30' to the device 50.

In an embodiment, as discussed above, the second and fourth members 52, 54 are made at least in part of a rigid material, each in the form of a layer of rigid material. When subjected to the radial vibration load VL', the second and fourth members 52, 54 remain non-deformed (i.e. at least substantially non-deformed) due to their low transversal expansion, low radial compression and/or stiffness, while the device 50 is being compressed. Thus, their respective radial dimensions remain substantially invariable when the device 50 is subjected to the radial vibration load VL'.

In this particular embodiment, the first, third and fifth members 51, 53, 55, which are in this case viscoelastic members, may each deform to a certain extent when the radial dimension 34' of the annular space 33' is being reduced and the device 50 squeezed (i.e. compressed), and they may each absorb at least partially the radial vibration load VL'. In an embodiment, the first member 51 may be more deformable than the third member 53, which may be more deformable than the fifth member 55 when subjected to the radial vibration load VL'. This may be due to different properties of each one of the first, third and fifth members 51, 53, 55, including, for instance, their respective dimensions (e.g. radial dimensions, transversal dimensions), stiffness, other material properties, or a combination thereof.

In an embodiment, a radial dimension 56 (i.e. thickness) of the first member 51 is smaller than a radial dimension 58 (i.e. thickness) of the fifth member 55, which is smaller than a radial dimension 57 (i.e. thickness) of the third member 53. Also, in this particular embodiment, the first member 51 is transversally larger than the third member 53, which is transversally larger than the fifth member 55.

In this particular embodiment, the fifth member 55 is stiffer than the third member 53, which is stiffer than the first member 51. That is, a radial stiffness E5 of the fifth member 55 is substantially greater than a radial stiffness E3 of the third member 53, and the radial stiffness E3 is greater than a radial stiffness E1 of the first member 51. That is, the bodies of the device 50 are arranged such that they have a radially outwardly decreasing stiffness. This may be different in other embodiments.

This particular combination of members with the properties discussed above, including their respective stiffness, dimensions and relative position may be different in other embodiments. For instance, there may not be rigid members/layers between adjacent viscoelastic members, the members may be reordered such as to obtain a body with a radially outwardly increasing stiffness (as opposed to the embodiment of FIG. 5), and/or their respective radial or transversal dimensions may be different.

Combining a plurality of members with different stiffness, dimensions, and/or damping properties may improve damping capabilities of the device 50 when subjected to the radial vibration load VL'. For instance, this may allow a plurality of cumulative operating stages (e.g. cumulative stages allowing a progressively increasing stiffness of the bearing housing 30' over given ranges of vibration amplitudes). In an embodiment, the device 50 has three operating stages, in which the device 50 may absorb at least partially the radial vibration load VL' and progressively increase the total radial stiffness Sh' of the bearing housing 30'. In an embodiment, in each operating stage, each one of the first, third and fifth members 51, 53, 55 may deform to absorb at least partially the radial vibration load VL' transmitted to the bearing housing 30' via the bearing 20' to a certain extent. In a first operating stage, over a first vibration amplitude range, a ratio of a variation of the radial dimension 56 of the first member 51 over a variation of the radial dimension 34' of the annular space 33' is at least 0.95, a ratio of a variation the radial dimension 57 of the third member 53 over the variation of the radial dimension 34' of the annular space 33' is no more than 0.04, and a ratio of a variation the radial dimension 58 of the fifth member 55 over the variation of the radial dimension 34' of the annular space 33' is no more than 0.01. In a second operating stage, over a second vibration amplitude range where the vibration amplitudes become greater than the first vibration amplitude range, the ratio of the variation of the radial dimension 56 of the first member 51 over the variation of the radial dimension 34' of the annular space 33' is no more than 0.85, the ratio of the variation the radial dimension 57 of the third member 53 over the variation of the radial dimension 34' of the annular space 33' is at least 0.13, and the ratio of the variation the radial dimension 58 of the fifth member 55 over the variation of the radial dimension 34' of the annular space 33' is no more than 0.02. Finally, in a third operating stage, over a third vibration amplitude range where the vibration amplitudes become greater than the second vibration amplitude range, the ratio of the variation of the radial dimension 56 of the first member 51 over the variation of the radial dimension 34' of the annular space 33' is no more than 0.8, the ratio of the variation the radial dimension 57 of the third member 53 over the variation of the radial dimension 34' of the annular space 33' is at no more than 0.15, and the ratio of the variation the radial dimension 58 of the fifth member 55 over the variation of the radial dimension 34' of the annular space 33' is at least 0.05. In other embodiments, the above ratios may be different, depending on the damping capabilities and the cumulative operating stages of the device 50.

A method for absorbing radial vibrations transmitted by a bearing 20 to a bearing housing 30, 30' is also provided. In a particular embodiment, the method comprises deforming a first member (e.g. 41, 51) of the device (e.g. 40, 50) upon a reduction of a radial dimension of the annular space (e.g. 33, 33') while receiving a radial vibration load VL via the bearing 20 to absorb at least partially the radial vibration load VL over a given range of vibration amplitude in a first operating stage. The device transitions subsequently from that first operating stage to a second operating stage in which a second member (e.g. 42, 53) having a stiffness S2 greater than that of the first member is abutted between the inner wall (e.g. 31, 31') and outer wall (e.g. 32, 32') when the range of vibration amplitude is exceeded. In this second operating stage, the total radial stiffness Sh of the bearing housing (e.g. 30, 30') is increased, as discussed above with respect to some embodiments.

In a particular embodiment, the disclosed bearing housing 30 may help reducing significantly the vibrations of the gas turbine engine 10 as a whole, reducing fan tip clearance loss, and/or reducing (e.g. reducing or in some cases avoiding) low-pressure boost rubbing.

In an embodiment, the bearing housing 30 with the device 40 may provide a reduction of at least 20% of the fan 12 deflection over the fan 12 deflection with a bearing housing 30 without such device 40.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A bearing housing for a bearing in a gas turbine engine, the bearing housing comprising:
    an inner wall configured to support the bearing, and an outer wall radially spaced from the inner wall, an annular space being defined between the inner and outer walls; and
    a device extending from the inner wall toward the outer wall, the device including at least a first and a second member positioned in series with respect to each other in a radial direction between the inner and outer walls, the second member having a radial stiffness greater than a radial stiffness of the first member, wherein a radial dimension of the second member remains substantially constant while the first member compresses and transversely expands upon compression between the inner and outer walls moving radially toward one another.

2. The bearing housing as defined in claim 1, further comprising a hairpin-shaped wall connecting the inner wall and the outer wall.

3. The bearing housing as defined in claim 1, further comprising a radial gap between one of the first and second members of the device and one of the inner and outer walls.

4. The bearing housing as defined in claim 3, wherein the gap is selected to permit an allowable range of bearing movement before the device prevents the bearing movement from exceeding the allowable range of bearing movement.

5. The bearing housing as defined in claim 1, wherein a portion of the first member extends in parallel to the second member between the inner and outer walls.

6. The bearing housing as defined in claim 1, wherein the first member is annular and extends circumferentially in the annular space around the second member.

7. The bearing housing as defined in claim 6, wherein the second member is annular and extends circumferentially in the annular space, between the first member and one of the inner and outer walls.

8. The bearing housing as defined in claim 1, wherein the second member has a peripheral recess, the first member received in the recess.

9. The bearing housing as defined in claim 1, wherein the first member is made at least in part of an elastomeric material.

10. The bearing housing as defined in claim 1, wherein the first member is made at least in part of a lattice structure.

11. The bearing housing as defined in claim 10, wherein the lattice structure is a metal foam.

12. The bearing housing as defined in claim 1, wherein the device further includes a third member in series with the first and second members between the inner and outer walls, the third member having a radial stiffness greater than the radial stiffness of the first member.

13. A bearing housing for a bearing in a gas turbine engine, the bearing housing comprising:
- an inner shell configured to support the bearing;
- an outer shell disposed radially outwardly from and connected to the inner shell, the inner shell and the outer shell defining an annular space therebetween, the annular space having a radial dimension; and
- a snubber and a damper disposed in series with respect to each other in a radially direction in the annular space, the snubber having a stiffness greater than a stiffness of the damper, the damper configured to deform in use when the inner and outer shells move radially toward one another wherein a radial dimension of the snubber remains substantially constant while the damper deforms upon the inner and outer shells moving radially toward one another.

14. The bearing housing as defined in claim 13, further comprising a hairpin-shaped wall connecting the inner shell and the outer shell, the wall being elastically deflectable to allow a relative radial movement between the inner shell and the outer shell.

15. The bearing housing as defined in claim 13, wherein the snubber is made of a rigid material and the damper is made of an elastomeric material.

16. The bearing housing as defined in claim 13, wherein the snubber has a hollowed-out body with a plurality of radial spokes and a peripheral recess in the form of an annular channel, the damper at least partially received in the peripheral recess.

17. The bearing housing as defined in claim 13, wherein the snubber has a peripheral recess, the damper received in the recess, and the snubber contacts both the inner and outer shell when the damper is compressed and fully recedes in the recess.

18. A method for absorbing radial vibrations transmitted by a bearing to a bearing housing having inner and outer cylindrical walls defining between them an annular space, the method comprising:
- receiving a radial vibration load from a shaft mounted to the bearing, the radial vibration load receiving at the inner cylindrical wall,
- allowing a radial movement of the inner cylindrical wall toward the outer cylindrical wall to reduce the annular space over an allowable range of radial movement of the bearing,
- deforming radially a damper in the annular space as a response to the radial movement of the inner cylindrical wall toward the outer cylindrical wall;

and then preventing a radial movement in excess of the allowable range of radial movement by loading a snubber in the annular space having a stiffness greater than the damper to increase a radial stiffness of the bearing housing, a radial dimension of the snubber remaining substantially constant while the damper is deforming upon the inner and outer cylindrical walls moving radially toward one another to reduce the annular space.

\* \* \* \* \*